(12) United States Patent
Weber et al.

(10) Patent No.: US 6,983,090 B2
(45) Date of Patent: Jan. 3, 2006

(54) HIGH RESOLUTION TUNABLE OPTICAL FILTER

(75) Inventors: John Weber, Ottawa (CA); Xiang Zhu, Ottawa (CA); Shane H. Woodside, Ottawa (CA)

(73) Assignee: JDS Uniphase Inc., Ottawa (CA)

( * ) Notice: Subject to any disclaimer, the term of this patent is extended or adjusted under 35 U.S.C. 154(b) by 77 days.

(21) Appl. No.: 10/384,821

(22) Filed: Mar. 11, 2003

(65) Prior Publication Data

US 2003/0179990 A1 Sep. 25, 2003

Related U.S. Application Data

(60) Provisional application No. 60/365,772, filed on Mar. 21, 2002.

(51) Int. Cl.
  *G02B 6/26* (2006.01)
  *G01J 3/28* (2006.01)

(52) U.S. Cl. .................. 385/27; 356/328; 356/334; 385/39

(58) Field of Classification Search ............ 385/39, 385/37, 27, 18, 24, 35, 33, 36; 372/20, 102; 356/301, 571, 572, 578, 566, 129, 130
See application file for complete search history.

(56) References Cited

U.S. PATENT DOCUMENTS

| | | | |
|---|---|---|---|
| 3,865,490 A * | 2/1975 | Grossman | 356/302 |
| 4,763,969 A | 8/1988 | Khoe et al. | 350/96.19 |
| 5,305,402 A | 4/1994 | Hill et al. | 385/25 |
| 5,420,416 A | 5/1995 | Iida et al. | 250/201.1 |
| 5,594,744 A | 1/1997 | Lefevre et al. | 372/20 |
| 5,802,085 A | 9/1998 | Lefevre et al. | 372/20 |
| 6,108,471 A | 8/2000 | Zhang et al. | 385/37 |
| 6,275,630 B1 | 8/2001 | Yang et al. | 385/37 |
| 6,430,340 B1 | 8/2002 | Iida et al. | 385/33 |
| 2002/0067887 A1 | 6/2002 | Tomlinson et al. | 385/37 |
| 2002/0126385 A1 | 9/2002 | Asami et al. | 359/571 |
| 2002/0176149 A1 * | 11/2002 | Davis et al. | 359/290 |
| 2003/0007148 A1 * | 1/2003 | Moon et al. | 356/328 |
| 2003/0090756 A1 * | 5/2003 | Moon et al. | 359/110 |
| 2003/0174939 A1 * | 9/2003 | Moon et al. | 385/27 |
| 2004/0008401 A1 * | 1/2004 | Szczepanek et al. | 359/290 |

* cited by examiner

*Primary Examiner*—Frank G. Font
*Assistant Examiner*—James P. Hughes
(74) *Attorney, Agent, or Firm*—Teitelbaum & MacLean; Neil Teitelbaum; Doug MacLean

(57) ABSTRACT

A high-resolution tunable optical filter uses a dispersive element in a double pass configuration. The double pass configuration is provided by a reflective quarter-wave plate that conveniently reduces polarization dispersion loss (PDL) of the filter. The filter also includes a fibre tube for supporting an input optical fibre and an output optical fibre, and a lens having an optical axis, which is disposed such that a focal point thereof is substantially at one of the input and output optical fibres. To provide increase resolution the filter is tuned by rotating the reflective quarter-wave plate. To provide high power capabilities the fibre jackets of the input and output fibres are optionally stripped back. To provide a symmetrical spectral response the fibre tube is optionally mounted at an angle to the optical axis of the lens.

22 Claims, 10 Drawing Sheets

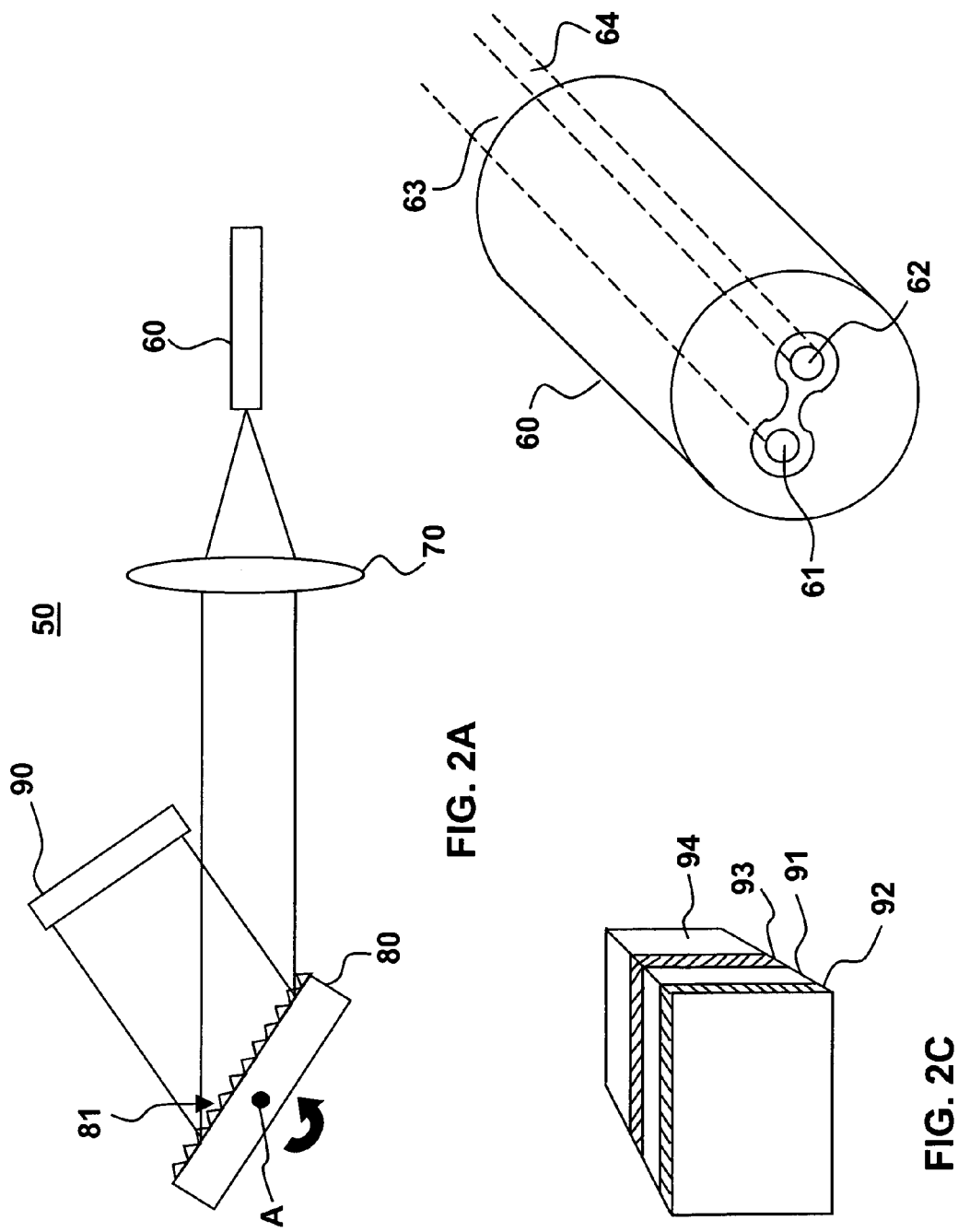

HIGH RESOLUTION TUNABLE OPTICAL FILTER

CROSS-REFERENCE TO RELATED APPLICATIONS

This application claims priority from U.S. Provisional Appl. No. 60/365,772 filed on Mar. 21, 2002.

MICROFICHE APPENDIX

Not Applicable

FIELD OF THE INVENTION

The present invention relates generally to optical devices using a dispersive element in a double pass configuration and more particularly to a high resolution tunable optical filter.

BACKGROUND OF THE INVENTION

Optical filters have many applications in wavelength division multiplexing (WDM) systems, including but not limited to optical spectrum analysis, laser testing, wavelength demultiplexing, and amplified spontaneous emission filtering. Traditionally, optical filters have been based on fibre Bragg gratings (FBGs), thin film dielectric interference filters, Fabry-Perot filters, phased array waveguides, and diffraction gratings. The ideal optical filter is usually associated with flat channel passbands, low insertion loss, high isolation, low cost, high reliability and field ruggedness, high thermal stability, and good filter roll-off characteristics. Furthermore, in many instances it is preferable that the filter is tunable.

Referring to FIG. 1, there is shown a conventional tunable optical filter using a diffraction grating. The filter 2 includes an input optical fibre 4, an output optical fibre 6, a collimating/focussing lens 8, and a diffraction grating 10. The diffraction grating 10 is rotatable as shown in FIG. 1, in order to change the angle of incidence, and thus change the wavelength(s) that are filtered. Examples of this type of configuration are taught in U.S. Pat. Nos. 5,420,416, and 6,430,340 to Iida, incorporated herein by reference. Unfortunately, the diffraction grating used in these devices is typically polarization sensitive (i.e., the diffraction efficiency varies for light having different polarization states), and hence these types of filters typically exhibit significant polarization dependent loss (PDL).

U.S. Pat. Appl. 20002/0126385 proposes a configuration that reduces PDL utilizing a polarization beamsplitter and reflector for redirecting one of the beams of light transmitted from the polarization beamsplitter. Unfortunately, the polarization beamsplitter increases the cost and size of the device and further complicates optical alignment.

It is an object of the instant invention to provide a tunable optical filter with reduced PDL.

It is a further object of the instant invention to provide a tunable optical filter having increased resolution.

SUMMARY OF THE INVENTION

The instant invention relates to a high-resolution tunable optical filter that uses a dispersive element in a double pass configuration. The double pass configuration is provided by a reflective quarter-wave plate that conveniently reduces PDL. Advantageously, the filter is tuned by rotating the reflective quarter-wave plate, thus providing increased resolution.

In accordance with the invention there is provided an optical filter comprising: an input port for launching an optical signal into the optical filter; a collimator disposed for collimating light transmitted from the input port; a dispersive element disposed for dispersing the collimated light according to wavelength in a dispersion plane; a reflective retarder disposed for reflecting at least a portion of the dispersed light back to the dispersive element; a focussing element disposed for receiving the light transmitted from the dispersive element and substantially focussing it to a point; and an output port disposed at the point for receiving the focussed light, wherein the reflective retarder is rotatable about an axis substantially perpendicular to the dispersion plane for tuning the optical filter.

In accordance with the instant invention there is provided an optical filter comprising: a fibre tube for supporting an input optical fibre and an output optical fibre; a lens having an optical axis, the lens disposed such that a focal point of the lens is substantially at one of the input and output optical fibres; a dispersive element disposed for receiving light from the lens and for dispersing it in a dispersion plane; and a reflective retarder for reflecting at least a portion of the dispersed light back to the dispersive element, the lens, and the output optical fibre, wherein the reflective retarder is rotatable about an axis substantially perpendicular to the dispersion plane for tuning the optical filter.

In accordance with the instant invention there is provided an optical filter comprising: a fibre tube for supporting an input optical fibre and an output optical fibre, the fibre tube having an angled end face; a lens having an optical axis, the lens disposed such that a focal point of the lens is substantially at the angled end face; a dispersive element disposed for receiving light from the lens and for dispersing it in a dispersion plane; and a reflective retarder for reflecting at least a portion of the dispersed light back to the dispersive element, the lens, and the output optical fibre, wherein the fibre tube is disposed at an angle to the optical axis of the lens.

In accordance with the instant invention there is provided an optical device comprising: a fibre tube for supporting an input optical fibre and an output optical fibre, the fibre tube having an angled end face; and a lens having an optical axis, the lens disposed such that a focal point of the lens is substantially at the angled end face, wherein an axis of the fibre tube is disposed at an angle to the optical axis of the lens, the angle selected such that an axis of a cone of light emerging from the input optical fibre is coincident with the optical axis of the lens.

BRIEF DESCRIPTION OF THE DRAWINGS

Exemplary embodiments of the invention will now be described in conjunction with the following drawings wherein like numerals represent like elements, and wherein:

FIG. 2a is a schematic diagram of a tunable filter having reduced PDL;

FIG. 2b is a perspective view of the fibre tube shown in FIG. 2a;

FIG. 2c is a perspective view of the reflective retarder shown in FIG. 2a;

DETAILED DESCRIPTION OF THE PREFERRED EMBODIMENTS

Figure 1:
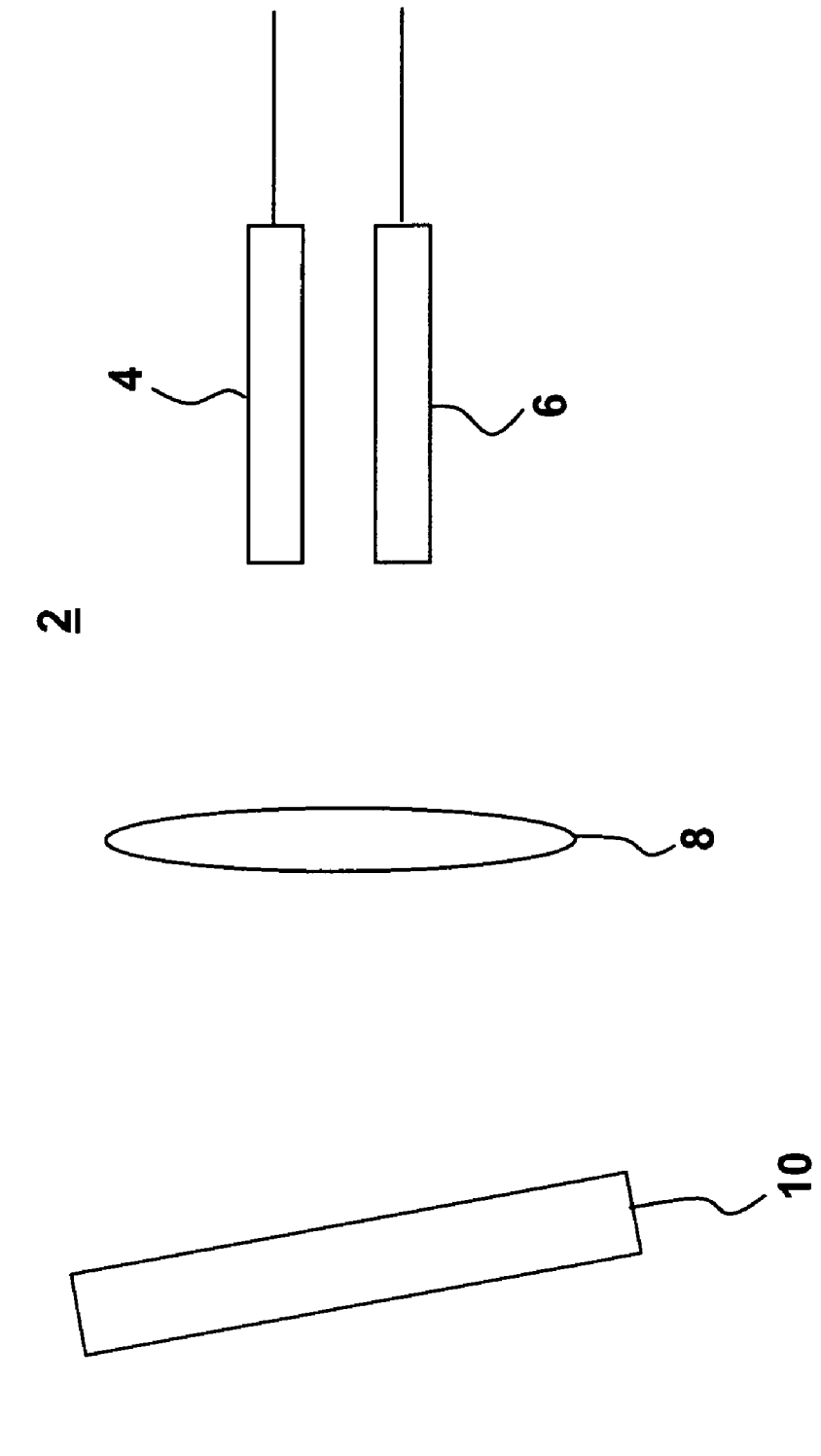
FIG. 1 is a schematic diagram of a prior art tunable filter.

Referring to FIG. 2a there is shown a tunable optical filter having reduced PDL. The optical filter 50 includes an input/output fibre tube 60 that houses input and output optical fibres ends (61 and 62 in FIG. 2b), a collimating/focussing lens 70, a diffraction grating 80, and a reflective retarder 90. The diffraction grating 80 is rotatable about axis A, which is approximately parallel to the diffraction lines 81 of the grating and perpendicular to the plane of the figure.

In this embodiment, the diffraction grating 380 is a reflective grating. Alternatively, the diffraction grating 380 is replaced with a transmissive dispersive element. In this embodiment, the fibre tube 360 is a double bore tube as, for example, shown in FIG. 2b, wherein each bore holds one of the input and output optical fibre ends 61 and 62. Alternatively, the fibre tube has a different configuration that accommodates two fibre ends. Preferably, the ends 61, 62 of input and output optical fibres 63, 64 are placed approximately at the focal point of lens 370. Preferably, the lens is a collimating/focussing lens such as a doublet lens, a plano-convex lens, a spherical lens, a diffractive lens or a gradient index (GRIN) lens. Preferably, the reflective retarder 90 functions as both a quarter-wave plate and a reflector.

Referring to FIG. 2c, the reflective retarder 90 is shown as a quarter-wave plate 91 with antireflection coating 92 on one side (e.g., facing the diffraction grating 80) and a highly reflective coating 93 on the opposite side (i.e., must be highly reflective for the wavelengths of interest). A common substrate 94 is provided for support. Alternatively, the reflective retarder 90 includes a separate quarter-wave plate and reflector. Preferably, the reflective retarder 90 is oriented such that the fast axis of the quarter-wave plate is in the plane of the reflector and inclined at 45 degrees from the diffraction plane.

The presence of the reflective retarder 90 reduces polarization dependent loss (PDL) that is inherent in the diffraction grating 80. For example, when randomly polarized light is transmitted from the lens 70 to the diffraction grating 80, the efficiency of diffraction of the component of light having an S polarization will be different than the efficiency of diffraction of the component having a P polarization state. When the diffracted light is reflected off the reflective retarder 90, the polarization of the original S and P components rotate by 90 degrees into P' and S', respectively. This rotation occurs due to the double pass of the quarter wave plate of the reflective retarder. Accordingly, the effective efficiency of the doubly passed grating is independent of input polarization and the filter PDL is greatly reduced. Notably, the tunable optical filter 50 depicted in FIG. 2a exhibits high isolation and good roll-off characteristics.

Figure 3A:
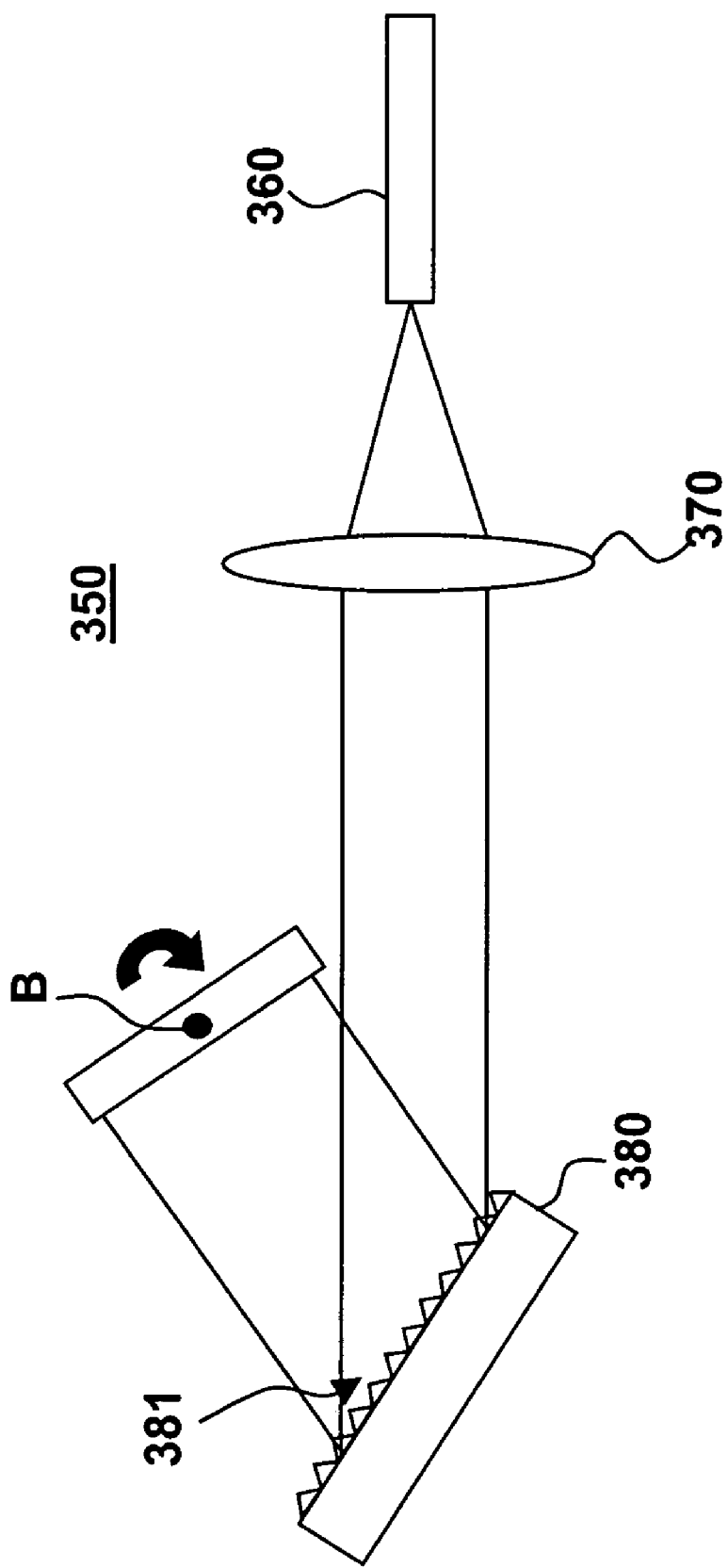
FIG. 3a is a schematic diagram of another tunable filter having reduced PDL.

Referring to FIG. 3a, there is shown a tunable optical filter in accordance with an embodiment of the instant invention. The optical filter 350 includes an input/output fibre tube 360 that supports ends of input and output optical fibres (shown one behind the other), a lens 370, a diffraction grating 380, and a reflective retarder 390.

In the instant embodiment, the fibre tube 360 is similar to the fibre tube shown in FIG. 2b, the reflective retarder is similar to the reflective retarder shown in FIG. 2c, and the diffraction grating 380 is a reflective grating. Alternatively, the fibre tube 360 has a different configuration that accommodates two fibre ends, the reflective retarder 390 is replaced with a separate quarter-wave plate and reflector and/or the diffraction grating 380 is replaced with a transmissive dispersive element. Preferably, the ends of input and output optical fibres are placed approximately at the focal point of lens 370. Preferably, the lens is a collimating/focussing lens such as a doublet lens, a plano-convex lens, a spherical lens, a diffractive lens or a gradient index (GRIN) lens.

The reflective retarder 390 is rotatable about axis B, which is approximately parallel to the diffraction lines of the grating and perpendicular to the plane of the figure. If the reflective retarder 390 includes a quarter-wave plate and a separate reflector, then the reflector is rotatable about axis B while the quarter-wave plate is fixed, or the quarter-wave plate/reflector combination is rotatable about axis B. Preferably, the reflective retarder 390 is orientated such that the quarter-wave plate has its optical axis is at a 45 degree angle relative to direction of the grating lines of the grating 380.

In operation, light transmitted through the input optical fibre exits the fibre tube 360 and emerges as a diverging beam of light that is transmitted to the lens 370. The lens 370 collimates the beam of light and transmits it to the diffraction grating 380, which disperses the light according to wavelength in a dispersion plane parallel to the plane of FIG. 3a. At least a portion of the dispersed light propagates to the reflective retarder 390 and is reflected back to diffraction grating 380, where it is transmitted as a collimated beam of light back to the lens 370. The lens 370 focuses the collimated beam of light at an end of the output optical fibre.

Figure 3B:
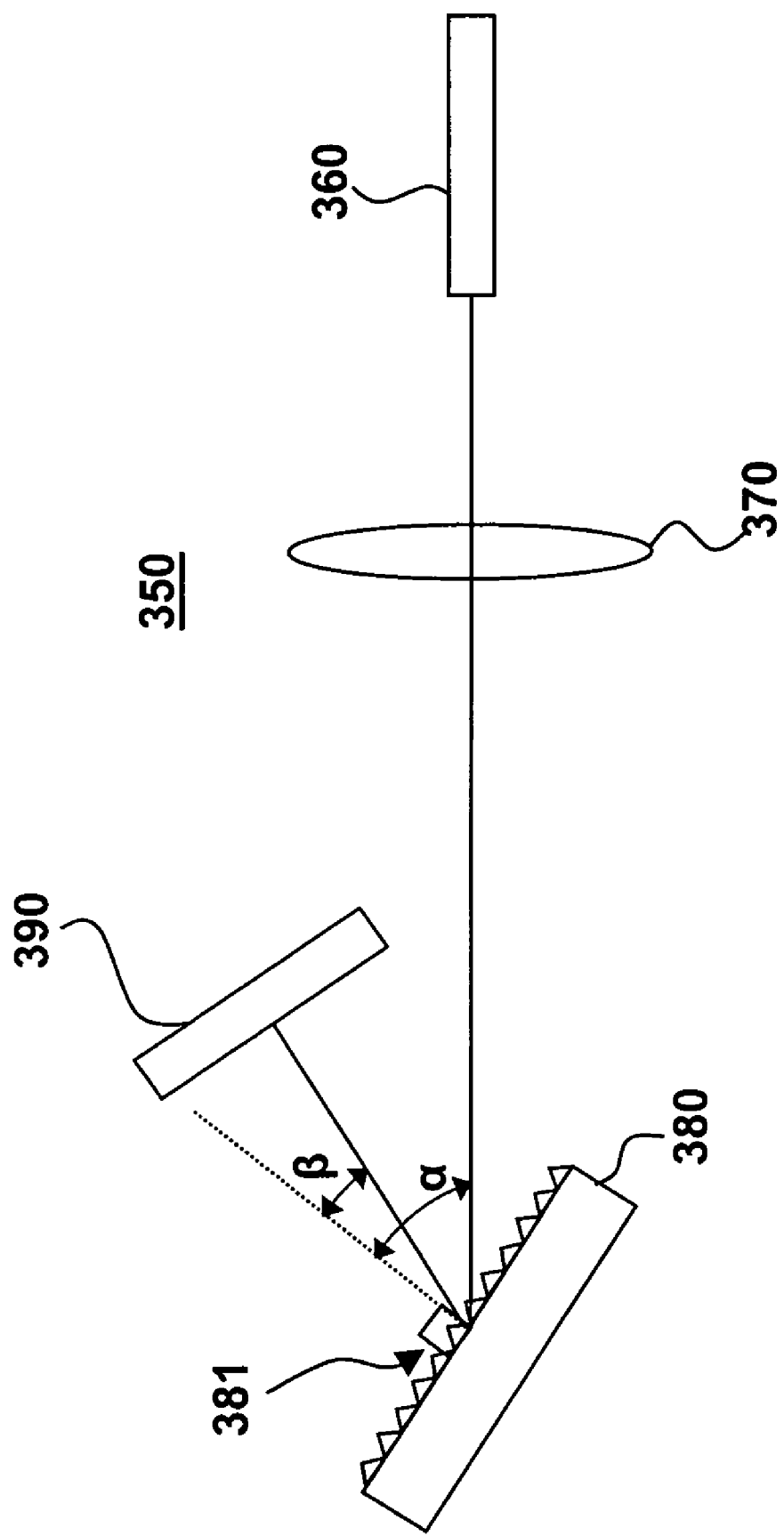
FIG. 3b shows the angles used in Eq. 1.
Figure 3C:
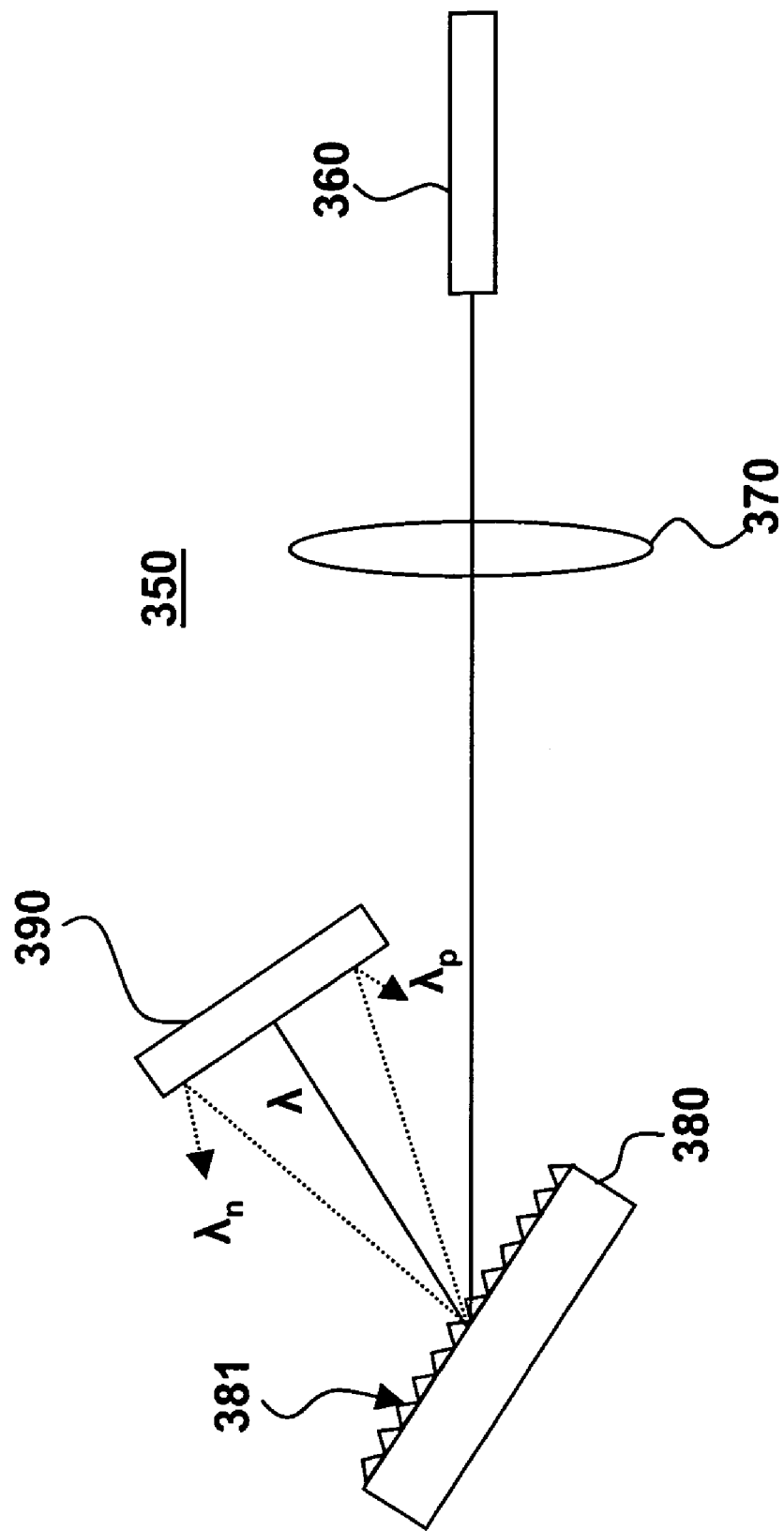
FIG. 3c illustrates how the filter in FIG. 3a functions as a bandpass filter.

Effectively, the filter 350 is a tunable narrow bandpass filter. For example, the filter 350 can be used to create a narrow band light source from a broadband light source, or to separate out individual channels from dense WDM systems. The wavelength (or wavelength range) that is passed by the optical filter is governed by the following grating equation:

$$\sin \alpha + \sin \beta = Kn\lambda \qquad (1)$$

where $\alpha$ is the angle of incidence, $\beta$ is the angle of diffraction, K is the diffraction order, n is the groove density of the grating, and $\lambda$ is the wavelength of interest (as depicted in FIG. 3b). In other words, for a given angle of incidence, $\alpha$, only light having wavelength $\lambda$ is diffracted (in the first order) at the required angle $\beta$. FIG. 3c illustrates how a ray of light having a centre wavelength outside this range (e.g., $\lambda_n, \lambda_p$) is diffracted at an angle that does not permit it to return to the output fibre end.

The filter 350 is tuned by rotating the reflective retarder 390 about its rotation axis B. Rotating the reflector 390 changes the relative orientation between the diffraction grating 380 and the reflector 390, thus affecting which wavelength(s) are passed. Notably, the reflector 390 in FIGS. 3a–c has to be rotated to a greater extent than the grating 80 shown in FIG. 2, to achieve the same change in wavelength. For example, in addition to changing the relative orientation between the diffraction grating 80 and reflector 90, rotating the diffraction grating 80 also essentially changes the angle of incidence, $\alpha$, and hence the angle of diffraction, $\beta$, and wavelength, $\lambda$. In fact, it has been calculated that the reflective retarder 390 needs to be rotated almost twice as much as the diffraction grating 80 in order to achieve the equivalent wavelength shift, all other factors being equal. According to one calculation, for first order diffraction from a diffraction grating having line density of 600 lines/nm, the diffraction grating 80 would have to rotate only 4.72 degrees, while the reflective retarder 390 would have to rotate 8.02 degrees, within a wavelength tuning range from 1420–1640 nm. Advantageously, this need for increased rotation translates to improved tuning resolution.

Furthermore, rotating the reflective retarder 390 rather than the diffraction grating 80, advantageously improves the insertion loss of filter 350 relative to filter 50. In particular, mounting the reflective retarder 390 to a rotating shaft allows for looser tolerance than mounting the grating 80 on a rotating shaft. For example, the adjustment of these devices requires that the gratings 80, 380 be rotated within less than 0.01 degrees in the plane of the grating surface for proper alignment, before tuning. This is more challenging when the grating is mounted on a rotating shaft, as depicted in FIG. 2. Notably, if the grating is insufficiently aligned, it is not possible to focus all wavelengths of interest into the output fibre when the filter is tuned.

Advantageously, the reflective retarder 390 also reduces the PDL of the filter. For example, when randomly polarized light is transmitted from the lens 370 to the diffraction grating 380, the efficiency of diffraction for components of light having an S polarization state will be different from the efficiency for the P polarization state. When the diffracted light is reflected off the reflective retarder, then the polarization of both components rotate by 90 degrees before being retransmitted to the grating. Accordingly, the polarization effects of the grating 380 are averaged and the filter PDL is reduced.

As discussed above, the tunable optical filter 350 illustrated in FIGS. 3a–c has reduced insertion loss, reduced PDL, and increased resolution. Moreover, this tunable optical filter is suitable for use in systems utilizing non-polarized light and that have separate input and output ports. Accordingly, the use of a circulator is avoided. This is an advantage of an optical device in accordance with the instant invention, in particular, in comparison to optical devices such as those disclosed in U.S. Pat. Nos. 5,594,744 and 5,802,085 to Lefevre et al., incorporated herein by reference.

Figure 4:
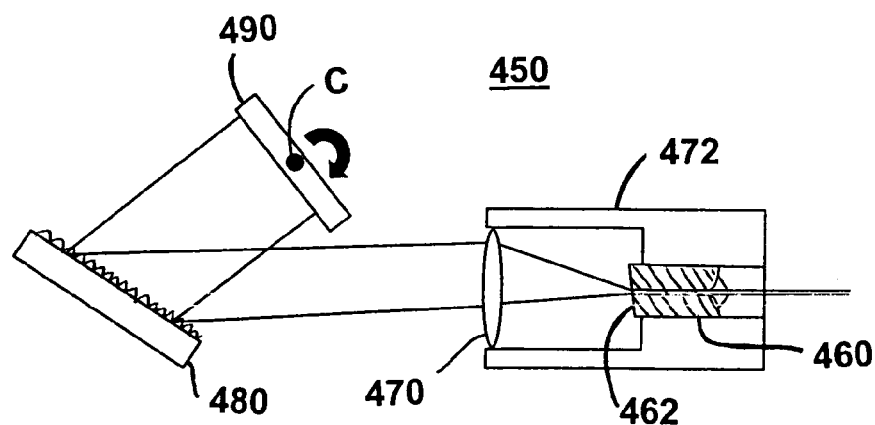
FIG. 4 is a schematic diagram of a tunable filter in accordance with another embodiment of the instant invention.

Referring to FIG. 4, there is shown a tunable optical filter in accordance with an embodiment of the invention. The optical filter 450 and its operation are similar to the optical filter discussed with respect to FIGS. 3a–c. In particular, the optical filter 450 includes an input/output fibre tube 460 that supports an input and an output optical fibre (shown one behind the other), a collimating/focussing lens 470, a diffraction grating 480, and a reflective retarder 490. However, in FIG. 4 the input/output fibre tube 460 and lens 470 are supported by lens holder 472 and the end 462 of the fibre tube 460 is shown to be angled to reduce backreflections.

Preferably, the fibre tube 460, which is also known as a capillary tube or a ferrule, is constructed from a material such as glass that can be polished together with the ends of input and output optical fibres (shown one behind the other) to produce the angled end face 462 (e.g., with an angle of 6–8 degrees with respect to the normal of the optical axis of the fibre tube). For example, in one embodiment it is preferred that the tube 460 is a glass double bore tube. In another, the fibre tube has a different configuration that accommodates two fibre ends. Preferably, the diffraction grating 480 is a reflective grating. Alternatively, the diffraction grating 480 is replaced with a transmissive dispersive element. Preferably, the ends of input and output optical fibres are placed approximately at the focal point of lens 470. The reflective retarder 490 is rotatable about axis C, which is approximately parallel to the diffraction lines of the grating and perpendicular to the plane of the figure. The reflective retarder 490 functions as both a quarter-wave plate and a reflector. Alternatively, the reflective retarder 490 is replaced with a separate quarter-wave plate and reflector. In the latter embodiment, the reflector is rotatable about axis C while the quarter-wave plate is fixed, or the quarter-wave plate/reflector combination is rotatable about axis C. Preferably, the reflective retarder 490 is a quarter-wave plate with antireflection coating on one side and a highly reflective coating on the opposite side. It is further preferred that the reflective retarder 490 is orientated such that its optical axis is at a 45 degree angle relative to the grating lines of the grating, which are perpendicular to the plane of FIG. 4.

In operation, light transmitted through the input optical fibre exits the fibre tube 460 and emerges as a diverging beam of light that is transmitted to the lens 470. Since the end 462 of the fibre tube 460 is angled, the diverging beam emerges at an angle. In particular, the axis of the cone of light emerging from the fibre end is not coincident with the fibre axis. The lens 470 collimates the beam of light and transmits it to the diffraction grating 480, which disperses the light according to wavelength in a dispersion plane parallel to the plane of FIG. 4. At least a portion of the dispersed light propagates to the reflective retarder 490 and is reflected back to diffraction grating 480, where it is transmitted as a collimated beam of light back to the lens 470. The lens 470 focuses the collimated beam of light at an end of the output optical fibre.

Unfortunately, since the cone axis of the diverging beam of light is not coincident with the optical axis of the collimating lens, the light focussed on the output fibre will not have a symmetrical spot shape and the resulting spectral response of the filter will not be symmetrical.

Figure 5:
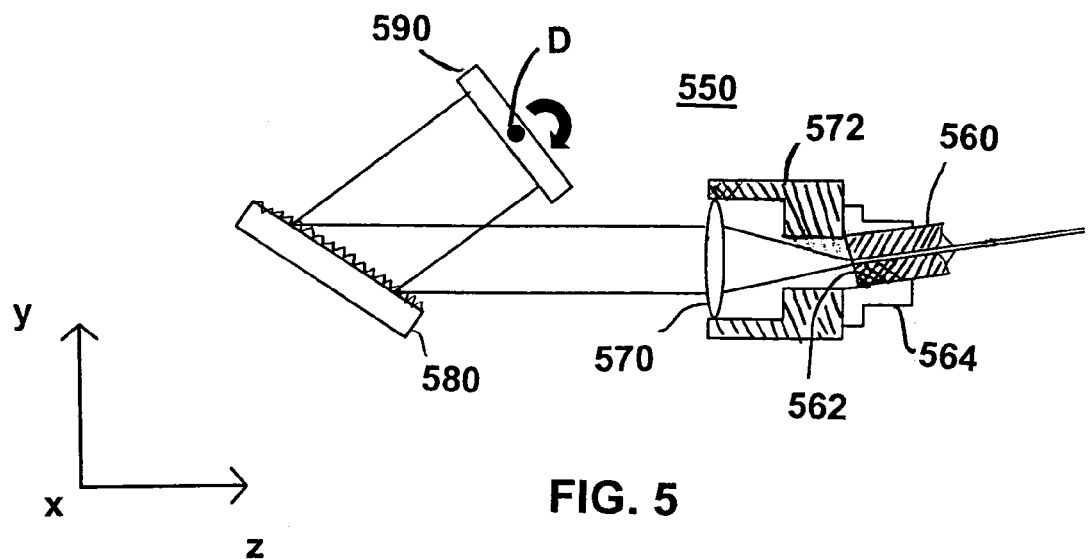
FIG. 5 is a schematic diagram of a tunable filter in accordance with yet another embodiment of the instant invention, having a symmetrical spectral response.

Referring to FIG. 5 there is shown a tunable optical filter in accordance with another embodiment of the instant invention exhibiting a symmetrical spectral response. The optical filter 550 and its operation are similar to the optical filter shown in FIG. 4. In particular, the optical filter 550 includes an input/output fibre tube 560 that supports an input and an output optical fibre (shown one behind the other), a collimating/focussing lens 570, a diffraction grating 580, and a reflective retarder 590. However, in FIG. 5 the input/output fibre tube 560 is mounted in a tube holder 564 and lens 570 is supported by lens holder 572. The tube holder 564 is coupled to the lens holder 572. The end 562 of the fibre tube 560 is angled to reduce backreflections. The fibre tube 560 is tilted relative to the axis of the lens 570 such that light emerging from the input fibre is incident on a central portion of the lens 570 and fills the optical system in a symmetrical fashion.

Preferably, the fibre tube 560, which is also known as a capillary tube or a ferrule, is constructed from a material such as glass that can be polished together with the ends of input and output optical fibres (shown one behind the other) to produce the angled end face 562. For example, in one embodiment it is preferred that the tube 560 is a glass double bore tube. Alternatively, the fibre tube has a different configuration that accommodates two fibre ends. In order for the fibre tube 560 to be accurately aligned in the filter in the x, y, and z axes, as well as with rotation about the x-axis, it is preferred that the fibre tube holder 564 be designed to allow both alignment and then permanent attachment of the fibre tube 560. For example, in one embodiment the fibre tube holder 564 is designed such that the fibre tube 560 is a sliding fit. The fibre tube 560 is held by an alignment jig clamp such that it can move in the x- y- and z-axis relative to the lens holder 572. The fiber tube holder 564 is free to move relative to the lens holder 572 and the fiber tube 560 during the alignment process. Once the parts are in alignment, the fiber tube 560 is glued to the fiber tube holder 564, which is in turn glued to the lens holder 572. In order to ensure proper alignment of the fibre tube 560 in the z-axis, it is aligned relative to the fiber tube holder 564 in a previous step and affixed by a set screw in fiber tube holder 564. Once on the alignment jig, the fiber tube holder is visually aligned with machined edges on the lens holder 572 and the alignment jig clamp is tightened on the fiber tube holder 564. At this point the set screw is released, allowing the fiber tube holder 564 freedom of movement.

Preferably, the diffraction grating 580 is a reflective grating. Alternatively, the diffraction grating 580 is replaced with a transmissive dispersive element. Preferably, the ends of input and output optical fibres are placed approximately at the focal point of lens 570. The reflective retarder 590 is rotatable about axis D, which is approximately parallel to the diffraction lines of the grating and perpendicular to the plane of the figure. The reflective retarder 590 functions as both a quarter-wave plate and a reflector. Alternatively, the reflective retarder 590 is replaced with a separate quarter-wave plate and a reflector. In the latter embodiment, the reflector is rotatable about axis D while the quarter-wave plate is fixed, or the quarter-wave plate/reflector combination is rotatable about axis D. Preferably, the reflective retarder 590 is a quarter-wave plate with antireflection coating on one side and a highly reflective coating on the opposite side. It is further preferred that the reflective retarder 590 is orientated such that its optical axis is at a 45 degree angle relative to the grating lines of the grating.

In operation, light transmitted through the input optical fibre exits the fibre tube 560 and emerges as a diverging beam of light that is transmitted to the lens 570. Since the end 562 of the fibre tube 560 is angled, the diverging beam emerges at an angle relative to the optical axis thereof. However, since the fibre tube 560 is also angled relative to the optical axis of the lens, the diverging beam of light is transmitted to a central region of the lens 570. The lens 570 collimates the beam of light and transmits it to the diffraction grating 580, which disperses the light according to wavelength in a dispersion plane parallel to the plane of FIG. 5. At least a portion of the dispersed light propagates to the reflective retarder 590 and is reflected back to diffraction grating 580, where it is transmitted as a collimated beam of light back to the lens 570. The lens 570 focuses the collimated beam of light at an end of the output optical fibre.

Since the light fills the optical system in a symmetrical fashion, the spot shape on the output fibre is symmetrical and the filter exhibits a substantially symmetrical spectral response.

Figure 6:
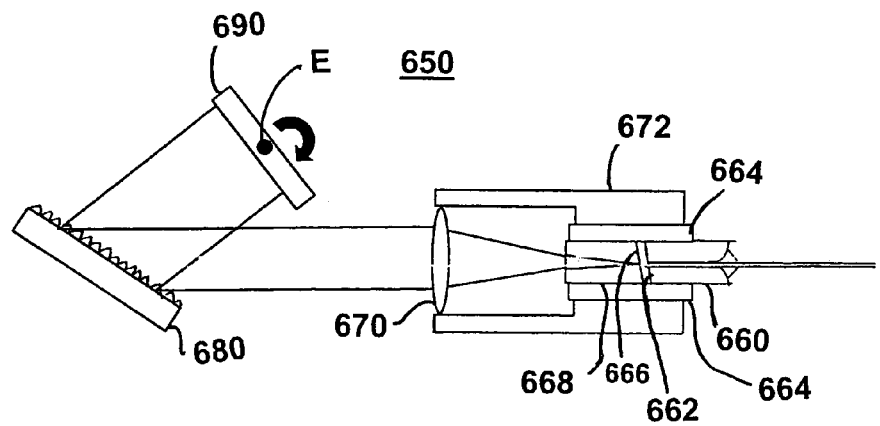
FIG. 6 is a schematic diagram of a tunable filter in accordance with another embodiment of the instant invention, having a symmetrical spectral response.

Referring to FIG. 6 there is shown another tunable optical filter in accordance with the instant invention exhibiting a symmetrical spectral response. The optical filter 650 includes an input/output fibre tube 660 that supports an input and an output optical fibre (shown one behind the other), a collimating/focussing lens 670, a diffraction grating 680, and a reflective retarder 690. The input/output fibre tube 660 has an end 662 that is angled to reduce backreflections, and which faces an angled end 666 of a light transmissive element having no optical power, in the form of a wedge shaped glass rod insert 668. The fibre tube 660 and the glass insert 668 are mounted together in a mounting sleeve 664 such that the angled ends mate. In this embodiment there is a space between the fibre tube 660 and the glass insert 668. In an alternate embodiment, there is no space between the two elements. The mounting sleeve 664 and lens 670 are secured in place with a lens holder 672.

Preferably, the glass rod insert 668 has a refractive index approximately equal to the refractive index of the core of the input and output optical fibers. Preferably, the fibre tube 660, which is also known as a capillary tube or a ferrule, is constructed from a material such as glass that can be polished together with the ends of input and output optical fibres (shown one behind the other) to produce the angled end face 662. For example, in one embodiment it is preferred that the tube 660 is a glass double bore tube. In another embodiment, the fibre tube has a different configuration that accommodates two fibre ends. Preferably, the diffraction grating 680 is a reflective grating. Alternatively, the diffraction grating is replaced with a transmissive dispersive element. Preferably, the ends of input and output optical fibres are placed approximately at the focal point of lens 670. The reflective retarder 690 is rotatable about axis E, which is approximately parallel to the diffraction lines of the grating and perpendicular to the plane of the figure. The reflective retarder 690 functions as both a quarter-wave plate and a reflector. Alternatively, the reflective retarder 690 is replaced with a separate quarter-wave plate and reflector. In the latter embodiment, the reflector is rotatable about axis E while the quarter-wave plate is fixed, or the quarter-wave plate/reflector combination is rotatable about axis E. Preferably, the reflective retarder 690 is a quarter-wave plate with antireflection coating on one side and a highly reflective coating on the opposite side. It is further preferred that the reflective retarder 690 is orientated such that its optical axis is at a 45 degree angle relative to the grating lines of the grating.

In operation, light transmitted through the input optical fibre exits the fibre tube 660 and emerges as a diverging beam of light that is transmitted to the lens 670. Since the end 662 of the fibre tube 660 is angled, the diverging beam emerges at an angle relative to the optical axis thereof while in the air gap. However, since the air gap is thin, the diverging light cone does not propagate very far before it experiences a second refraction at the first surface of the rod insert 666, which straightens out the diverging light cone. When the diverging cone of light passes through the exit end of the glass rod insert 168, it experiences another refraction. However, since the beam diameter is much larger at the exit end of the glass rod insert 168 the amount of Fresnel reflected light that can couple back into the input/output optical fibers is greatly reduced. It is further reduced by coating the exit end of the rod insert 668 with an antireflection coating. The lens 670 collimates the beam of light emerging from the glass rod insert 168 and transmits it to the diffraction grating 680, which disperses the light according to wavelength in a dispersion plane parallel to the plane of FIG. 6. At least a portion of the dispersed light propagates to the reflective retarder 690 and is reflected back to diffraction grating 680, where it is transmitted as a collimated beam of light back to the lens 670. The lens 670 focuses the collimated beam of light at an end of the output optical fibre. Since the glass rod insert 168 has the effect of straightening out the deflection of the cone of light radiating from the end of the output fibre end, the light fills the optical system in a symmetrical fashion, the spot shape on the output fibre is symmetrical, and the filter exhibits a substantially symmetrical spectral response.

Figure 7:
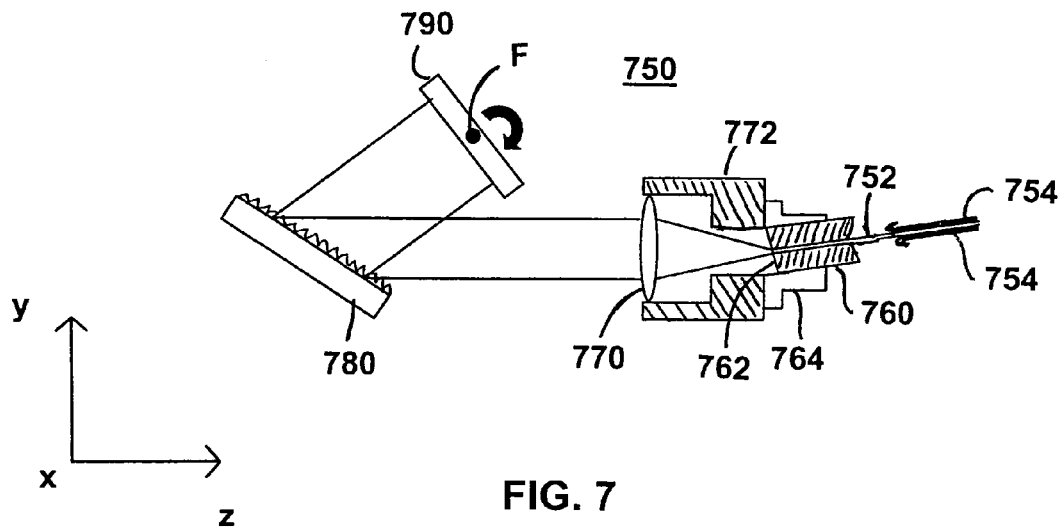
FIG. 7 is a schematic diagram of a tunable filter in accordance with another embodiment of the invention, suitable for high power applications.

Referring to FIG. 7 there is shown a tunable optical filter in accordance with the instant invention that is suitable for high power applications. The optical filter 750 and its operation are similar to the optical filter shown in FIG. 5. In particular, the optical filter 750 includes an input/output fibre tube 760 that supports an input and an output optical fibre 752 (only one is shown), a collimating/focussing lens 770, a diffraction grating 780, and a reflective retarder 790. The input/output fibre tube 760 is mounted in a tube holder 764, while the lens 770 is supported by a lens holder 772. The tube holder 764 and lens holder 772 are coupled together. The end 762 of the fibre tube 760 is angled to reduce backreflections. The fibre tube 760 is tilted relative to the axis of the lens 770 such that light emerging from the input fibre is incident on the lens 770 and fills the optical system in a symmetrical fashion. The fibre jackets 754 (only one is shown) are removed from the input and output optical fibres 752 in the vicinity of the fibre tube 760. For example, in one embodiment both fibre jackets are stripped back about 1–2 cm from the fibre tube 760.

Preferably, the fibre tube 760, which is also known as a capillary tube or a ferrule, is constructed from a material such as glass that can be polished together with the ends of input and output optical fibres (shown one behind the other) to produce the angled end face 762. For example, in one embodiment it is preferred that the tube 760 is a glass double bore tube. In order for the fibre tube 760 to be accurately aligned in the filter in the x, y, and z axes, as well as with rotation about the x-axis, it is preferred that the fibre tube holder 764 be designed to allow both alignment and then permanent attachment of the fibre tube 760. For example, in one embodiment the fibre tube holder 764 is designed such that the fibre tube 760 is a sliding fit. The fibre tube 760 is held by an alignment jig clamp such that it can move in the x- y- and z-axis relative to the lens holder 772. The fiber tube holder 764 is free to move relative to the lens holder 772 and the fiber tube 760 during the alignment process. Once the parts are in alignment, the fiber tube 760 is glued to the fiber tube holder 764, which is in turn glued to the lens holder 772. In order to ensure proper alignment of the fibre tube 760 in the z-axis, it is aligned relative to the fiber tube holder 764 in a previous step and affixed by a set screw in fiber tube holder 764. Once on the alignment jig, the fiber tube holder is visually aligned with machined edges on the lens holder 772 and the alignment jig clamp is tightened on the fiber tube holder 764. At this point the set screw is released, allowing the fiber tube holder 764 freedom of movement.

Preferably, the diffraction grating 780 is a reflective grating. Alternatively, the diffraction grating 780 is replaced with a transmissive dispersive element. Preferably, the ends of input and output optical fibres are placed approximately at the focal point of lens 770. The reflective retarder 790 is rotatable about axis F, which is approximately parallel to the diffraction lines of the grating and perpendicular to the plane of the figure. The reflective retarder 790 functions as both a quarter-wave plate and a reflector. Alternatively, the reflective retarder 790 is replaced with a separate quarter-wave plate and a reflector. In the latter embodiment, the reflector is rotatable about axis F while the quarter-wave plate is fixed, or the quarter-wave plate/reflector combination is rotatable about axis F. Preferably, the reflective retarder 790 is a quarter-wave plate with antireflection coating on one side and a highly reflective coating on the opposite side. It is further preferred that the reflective retarder 790 is orientated such that its optical axis is at a 45 degree angle relative to the grating lines of the grating.

In operation, light transmitted through the input optical fibre exits the fibre tube 760 and emerges as a diverging beam of light that is transmitted to the lens 770. Since the end 762 of the fibre tube 760 is angled, the diverging beam emerges at an angle relative to the optical axis thereof. Since the fibre tube 760 is angled relative to the optical axis of the lens, the diverging beam of light is transmitted to a central region of the lens 770. The lens 770 collimates the beam of light and transmits it to the diffraction grating 780, which disperses the light according to wavelength in a dispersion plane parallel to the plane of FIG. 7. At least a portion of the dispersed light propagates to the reflective retarder 790 and is reflected back to diffraction grating 780, where it is transmitted as a collimated beam of light back to the lens 770. The lens 770 focuses the collimated beam of light at an end of the output optical fibre. However, some of the light focussed by the lens 770 is not coupled into the output fibre. For example, while tuning the filter 750 some of the light is coupled into the fibre tube and/or cladding of the input and optical fibres, and is transmitted towards the fibre jacketing. Since the fibre jackets 774 surrounding the input and output fibres 752 have been stripped back past the fibre tube 760, the light will diverge before it impinges the jackets, and the chance that they will burn in the presence of a high-powered laser is significantly reduced.

Accordingly, the tunable optical filter shown in FIG. 7, is suitable for high power applications (e.g., greater than 1 W). This is an advantage of the instant invention over other types of tunable filters, which for example, use Fabry-Perot etalons or sliding thin films and need to restrict light density inside the cavity/cavities.

Another feature that makes the filter shown in FIG. 7 suitable for high power applications is the fact that the fibre tube 770 is mounted directly in the filter (i.e., without being first mounted to another optical component). This is in contrast to prior art designs, wherein the angled end of a fibre tube is frequently adhered to a matching angled end of a GRIN lens, the latter of which serves as a mounting base and provides easier alignment. Accordingly, a glue joint between the fibre tube and GRIN lens and/or any antireflection coatings on the GRIN lens cannot fail due to the effects of the high power light source. In fact, it is preferred that the optical filter shown in FIG. 7 does not include epoxy in the optical path where the light is focused (i.e, less than about 100 microns in diameter with respect to the core of the output optical fibre).

In another embodiment of the instant invention, the tunable optical filter 550 shown in FIG. 5 includes input and output optical fibres fabricated with high power resistive jacketing, thus making it suitable for high power applications without removing a portion of the jacketing.

Figure 8:
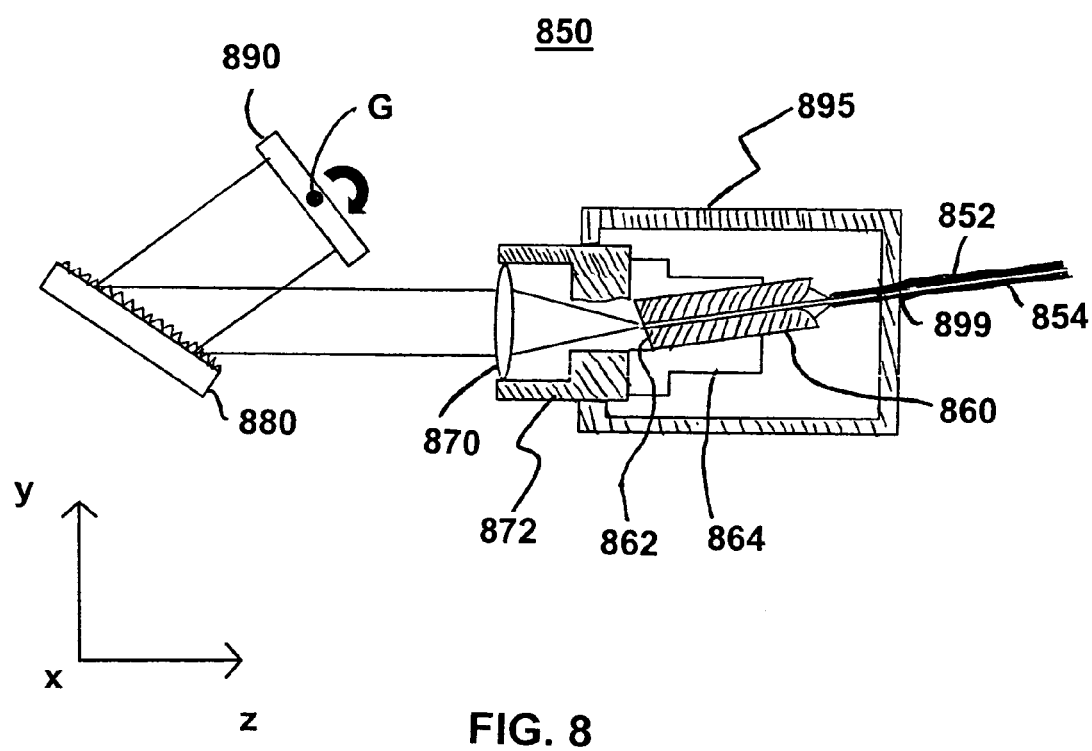
FIG. 8 is a schematic diagram of a tunable filter in accordance with another embodiment of the invention, including a strain relief tube.

Referring to FIG. 8, there is shown a tunable optical filter in accordance with yet another embodiment of instant invention, that is suitable for high power applications. The optical filter 850 and its operation are similar to the optical filter shown in FIG. 7. In particular, the optical filter 850 includes an input/output fibre tube 860 that supports an input and an output optical fibre 852 (only one is shown), a collimating/focussing lens 870, a diffraction grating 880, and a reflective retarder 890. The input/output fibre tube 860 is mounted in a tube holder 864, while the lens 870 is supported by a lens holder 872. The tube holder 864 and lens holder 872 are coupled together. The end 862 of the fibre tube 860 is angled to reduce backreflections. The fibre tube 860 is tilted relative to the axis of the lens 870 such that light emerging from the input fibre is incident on the lens 870 and fills the optical system in a symmetrical fashion. A fibre strain relief tube 895 is provided to protect the optical fibres from excess strain. In particular, the strain relief tube 895 includes a first end for coupling to the lens holder 860 and a second opposing end having an aperture 899 through which the input and output optical fibres extend. Advantageously, the fibre strain relief tube is optionally fabricated from black anodized aluminum so that it also functions as a light trap. Notably, the fibre tube 860 is significantly longer and larger than the fibre tube shown in FIG. 5.

Preferably, the fibre tube 860, which is also known as a capillary tube or a ferrule, is constructed from a material such as glass that can be polished together with the ends of input and output optical fibres (shown one behind the other) to produce the angled end face 862. For example, in one embodiment it is preferred that the tube 860 is a glass double bore tube. Alternatively, the fibre tube has a different configuration that accommodates two fibre ends. In order for the fibre tube 860 to be accurately aligned in the filter in the x, y, and z axes, as well as with rotation about the x-axis, it is preferred that the fibre tube holder 864 be designed to allow both alignment and then permanent attachment of the fibre tube 860. For example, in one embodiment the fibre tube holder 864 is designed such that the fibre tube 560 is a sliding fit. The fibre tube 860 is held by an alignment jig clamp such that it can move in the x- y- and z-axis relative to the lens holder 872. The fiber tube holder 864 is free to move relative to the lens holder 872 and the fiber tube 860 during the alignment process. Once the parts are in alignment, the fiber tube 860 is glued to the fiber tube holder 864, which is in turn glued to the lens holder 872. In order to ensure proper alignment of the fibre tube 860 in the z-axis, it is aligned relative to the fiber tube holder 864 in a previous step and affixed by a set screw in fiber tube holder 864. Once on the alignment jig, the fiber tube holder is visually aligned with machined edges on the lens holder 872 and the alignment jig clamp is tightened on the fiber tube holder 864. At this point the set screw is released, allowing the fiber tube holder 864 freedom of movement.

Preferably, the diffraction grating 880 is a reflective grating. Alternatively, the diffraction grating 880 is replaced with a transmissive dispersive element. Preferably, the ends of input and output optical fibres are placed approximately at the focal point of lens 870. The reflective retarder 890 is rotatable about axis G, which is approximately parallel to the diffraction lines of the grating and perpendicular to the plane of the figure. The reflective retarder 890 functions as both a quarter-wave plate and a reflector. Alternatively, the reflective retarder 890 is replaced with a separate quarter-wave plate and a reflector. In the latter embodiment, the reflector is rotatable about axis G while the quarter-wave plate is fixed, or the quarter-wave plate/reflector combination is rotatable about axis G. Preferably, the reflective retarder 890 is a quarter-wave plate with antireflection coating on one side and a highly reflective coating on the opposite side. It is further preferred that the reflective retarder 890 is orientated such that its optical axis is at a 45 degree angle relative to the grating lines of the grating.

In operation, light transmitted through the input optical fibre exits the fibre tube 860 and emerges as a diverging beam of light that is transmitted to the lens 870. Since the end 862 of the fibre tube 860 is angled, the diverging beam emerges at an angle relative to the optical axis thereof. Since the fibre tube 860 is angled relative to the optical axis of the lens, the diverging beam of light is transmitted to a central region of the lens 870. The lens 870 collimates the beam of light and transmits it to the diffraction grating 880, which disperses the light according to wavelength in a dispersion plane parallel to the plane of FIG. 8. At least a portion of the dispersed light propagates to the reflective retarder 890 and is reflected back to diffraction grating 880, where it is transmitted as a collimated beam of light back to the lens 870. The lens 870 focuses the collimated beam of light at an end of the output optical fibre. However, some of the light focussed by the lens 870 is not coupled into the output fibre. For example, while tuning the filter 850 some of the light is coupled into the fibre tube and/or cladding of the input and optical fibres, and is transmitted towards the fibre jacketing 854. Since the fibre tube 860 is fabricated to be larger and longer than necessary to simply hold and secure the input and optical fibres, the excess length allows the light that is not coupled into the output fibre, but that is focussed by the lens 870, to expand over the greater area and thereby lower the light intensity before it impinges on the fibre jackets 854. It is not necessary to strip away the fibre jackets as shown in FIG. 7.

Accordingly, the tunable optical filter shown in FIG. 8, is suitable for high power applications (e.g., greater than 1 W). Another feature that makes the filter shown in FIG. 8 suitable for high power applications is the fact that the fibre tube 870 is mounted directly in the filter (i.e., without being first mounted to another optical component).

Notably, stripping away a portion of the fibre jacket(s), using a high power resistive jacketing, and/or using a longer and larger fiber tube provides a tunable optical filter that is suitable for high power applications. Of course, these features are also applicable to the tunable optical filter shown in FIG. 2.

Furthermore, it is also possible to mount the fibre tube and lens as shown in FIGS. 4, 5, 6, 7, and 8, in the device shown in FIG. 2. In particular, in many instances it is advantageous to mount the fibre tube 60 at an angle relative to the optical axis of the lens 70, as shown in FIGS. 5, 7, and 8.

The above described embodiments of the invention are intended to be examples of the present invention and numerous modifications, variations, and adaptations may be made to the particular embodiments of the invention. For example, in each of the above embodiments, a fibre strain relief tube (e.g., as shown in FIG. 8) is optionally coupled to the lens holder or tube holder to protect the optical fibres from excess strain and/or to serve as a light trap.

Figure 9A:
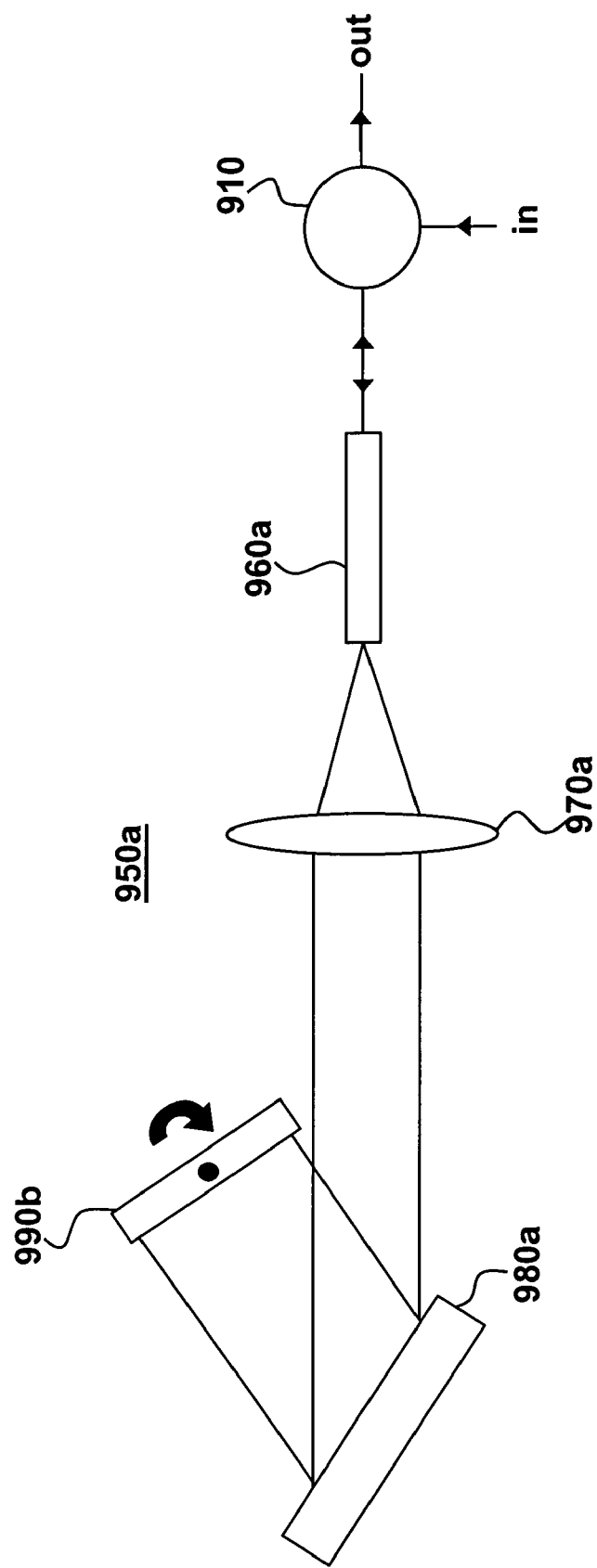
FIG. 9a is a schematic diagram of a tunable filter in accordance with another embodiment of the invention, incorporating a single bore tube and an optical circulator.
Figure 9B:
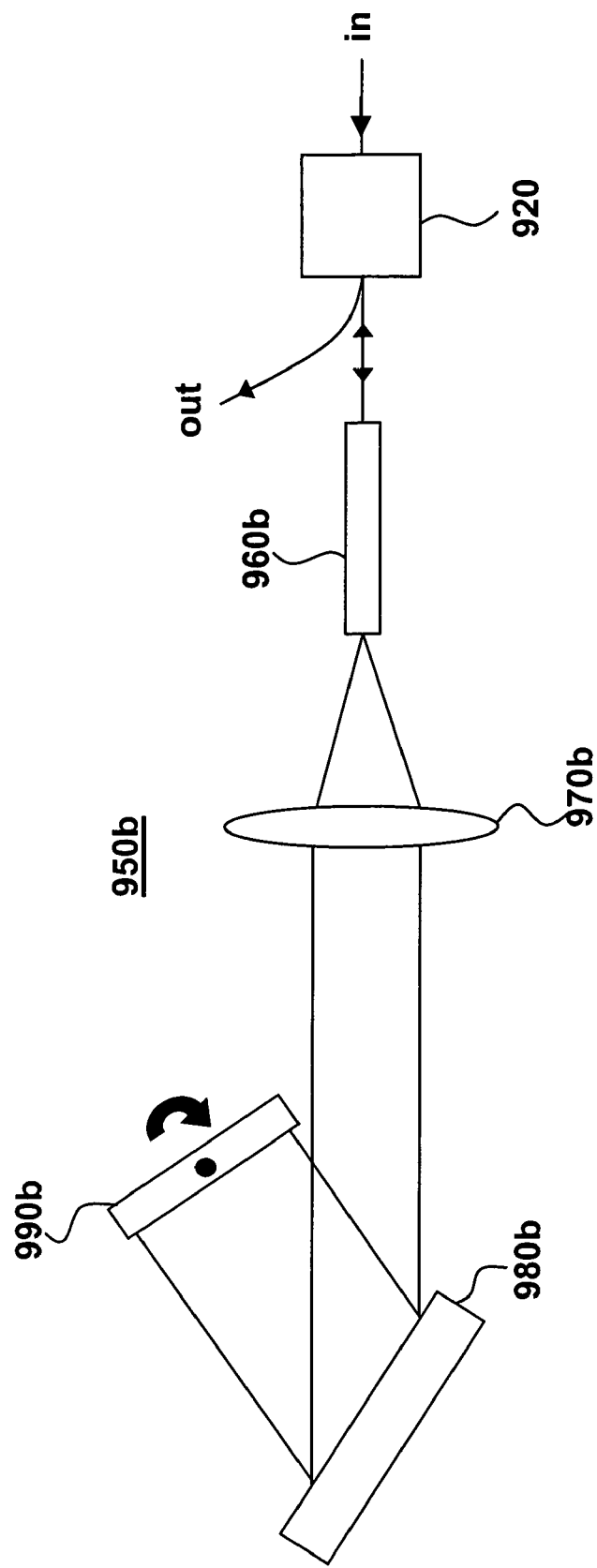
FIG. 9b is a schematic diagram of a tunable filter in accordance with another embodiment of the invention, incorporating a single bore tube and an optical coupler.

Similarly, in each of the embodiments described heretofore, the dual bore fibre tube is optionally replaced with a single bore tube accommodating a single optical fibre. In these instances, for example, a circulator (FIG. 9a) or coupler (FIG. 9b) is provided to separate the input and attenuated output optical signals from each other. Referring to FIG. 9a, the optical filter 950a and its operation are similar to the optical filter discussed with respect to FIGS. 3a–c. In particular, the optical filter 950a includes an input/output fibre tube 960a that supports a single input/output optical fibre, a collimating/focussing lens 970a, a diffraction grating 980a, and a reflective retarder 990a. However, in FIG. 9a the input/output optical fibre is coupled to a circulator 910. Light input through the input port of the circulator 910 is circulated into the filter where it is selectively attenuated, and output the output port of the circulator 910. Referring to FIG. 9b, the optical filter 950b and its operation are similar to the optical filter discussed with respect to FIG. 9a. In particular, the optical filter 950b includes an input/output fibre tube 960b that supports a single input/output optical fibre, a collimating/focussing lens 970b, a diffraction grating 980b, and a reflective retarder 990b. However, in FIG. 9b the input/output optical fibre is coupled to a coupler 920. Light input into the coupler 920 is directed into the filter where it is selectively attenuated, and is directed back to the coupler where it is directed to the output port.

Of course, numerous other embodiments may be envisaged, without departing from the spirit and scope of the invention.

What is claimed is:

1. An optical filter comprising:
   an input port for launching an optical signal into the optical filter;
   a collimator disposed for collimating light transmitted from the input port;
   a dispersive element disposed for dispersing the collimated light according to wavelength in a dispersion plane;
   a reflective retarder disposed for reflecting at least a portion of the dispersed light back to the dispersive element;
   a focussing element disposed for receiving the light transmitted from the dispersive element and substantially focussing it to a point; and
   an output port disposed at the point for receiving the focussed light, wherein the reflective retarder is rotatable about an axis substantially perpendicular to the dispersion plane for tuning the optical filter.

2. An optical filter according to claim 1, wherein the collimator and the focussing element comprise a same lens.

3. An optical filter according to claim 2, comprising an input optical fibre and an output optical fibre coupled to the input port and the output port, respectively.

4. An optical filter according to claim 3, comprising a fibre tube for supporting the input and output optical fibres.

5. An optical filter according to claim 4, wherein the fibre tube comprises an end face that is angled to reduce back reflection.

6. An optical filter according to claim 5, comprising a fibre tube holder for supporting the fibre tube.

7. An optical filter according to claim 6, comprising a lens holder having a first end for supporting the lens and a second end for mounting the fibre tube holder thereon.

8. An optical filter according to claim 7, wherein the fibre tube is disposed within the fibre tube holder such that the longitudinal axis of the fibre tube is at an angle relative to the optical axis of the lens.

9. An optical filter according to claim 8, wherein the angle is selected to compensate for angular refraction of a beam of light exiting the angled end face.

10. An optical filter according to claim 8, wherein a fibre jacket of at least one of the input and output fibres is stripped away past the fibre tube such that a region of the at least one of the input and output fibres is exposed.

11. An optical filter according to claim 1, wherein the output port comprises means for handling high power light that is not coupled into the output optical port.

12. An optical filter according to claim 11, wherein the means for handling high power comprises an input optical fibre coupled to the input port and an output optical fibre coupled to the output port, at least one of the input and output optical fibres having a portion of their fibre jacket removed to a length selected to prevent burning from the high power light.

13. An optical filter according to claim 11, wherein the means for handling high power comprises an input optical fibre coupled to the input port and an output optical fibre coupled to the output port, at least one of the input and output optical fibres having a fibre jacket fabricated from a high power resistive material.

14. An optical filter according to claim 11, wherein the means for handling high power comprises a fibre tube holder for mounting an input optical fibre that is coupled to the input port and an output optical fibre that is coupled to the output port, the fibre tube holder having a length selected to disperse the high power light such that a fibre jacket of at least one of the input and output optical fibres is other than burned by the light.

15. An optical filter according to claim 1, wherein the input port comprises means for making a spectral shape of the optical filter symmetrical.

16. An optical filter according to claim 15, wherein the means for making a symmetrical spectral shape comprises a fibre tube holder for mounting input and output optical fibres at an angle to the optical axis of the collimator, the input and output optical fibres coupled to the input and output ports, respectively.

17. An optical filter according to claim 15, wherein the means for making a symmetrical spectral shape comprises a glass rod coupled to an angled end of a fibre tube supporting input and output optical fibres coupled to input and output ports, respectively, the glass rod having an angled end for mating to the angled end of the fibre tube.

18. An optical filter according to claim 1, wherein the reflective retarder comprises a quarter-wave plate having an anti-reflection coating on one side and a highly reflective coating on an opposing side.

19. An optical filter according to claim 1, wherein the reflective retarder comprises a quarter-wave plate and a reflector.

20. An optical filter according to claim 1, wherein the dispersive element is fixedly mounted within the filter.

21. An optical filter according to claim 3, comprising a fibre strain relief tube for protecting the input and output optical fibres.

22. An optical filter according to claim 4, wherein the fibre tube is a double bore tube.

* * * * *